United States Patent [19]

Grover

[11] Patent Number: 4,493,208
[45] Date of Patent: Jan. 15, 1985

[54] DUAL ENGINE PROBE

[75] Inventor: Donald D. Grover, Kenosha, Wis.

[73] Assignee: Snap-on Tools Corporation, Kenosha, Wis.

[21] Appl. No.: 454,434

[22] Filed: Dec. 29, 1982

[51] Int. Cl.³ .......................................... G01M 15/00
[52] U.S. Cl. ................................ 73/117.3; 73/119 A
[58] Field of Search ................... 73/119 A, 117.3, 116

[56] References Cited

U.S. PATENT DOCUMENTS 4,337,648  7/1982  Gillespie ........................... 73/117.3

OTHER PUBLICATIONS

"Diesel Injection Timed Via Microwave Method," Automotive Engineering, Mar. 1982.

Primary Examiner—Jerry W. Myracle
Attorney, Agent, or Firm—Emrich & Dithmar

[57] ABSTRACT

The probe includes an elongated body having a reduced diameter portion at the front thereof. A light-transmitting tube is located in the bore of the body and abuts against the shoulder defined by the reduced diameter portion. A microwave conductor in the tube protrudes from the front end. A plastic tubular shield is located at the rear end of the body and is held in place by a sleeve encompassing both shield and the body.

7 Claims, 9 Drawing Figures

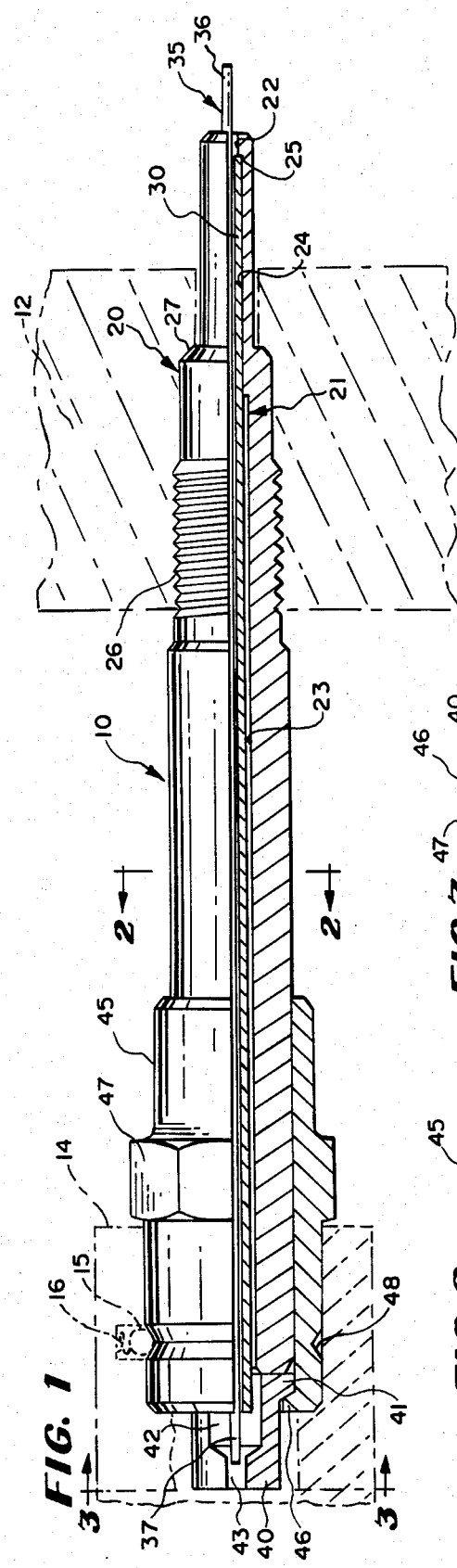
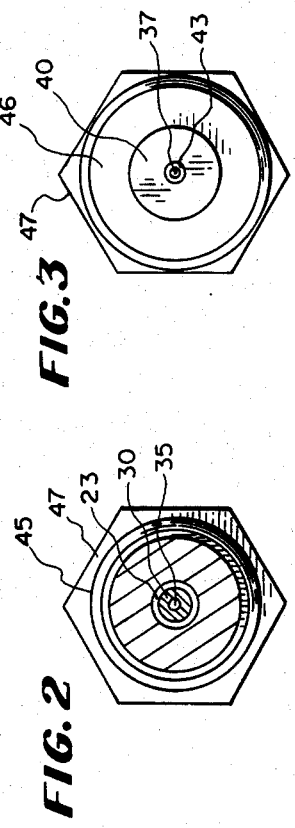
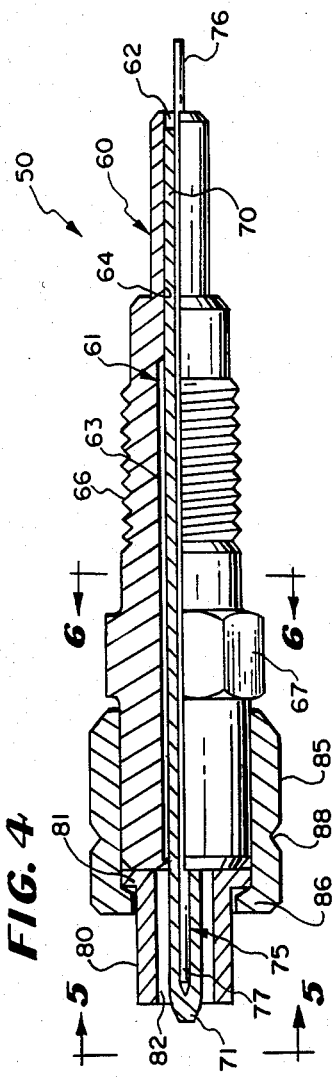
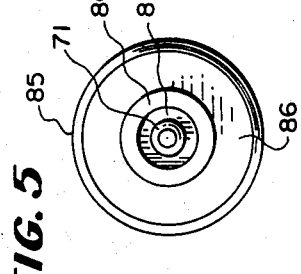
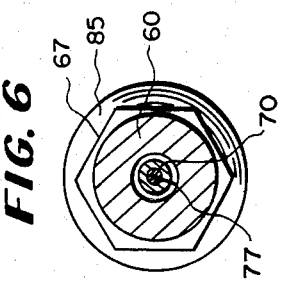

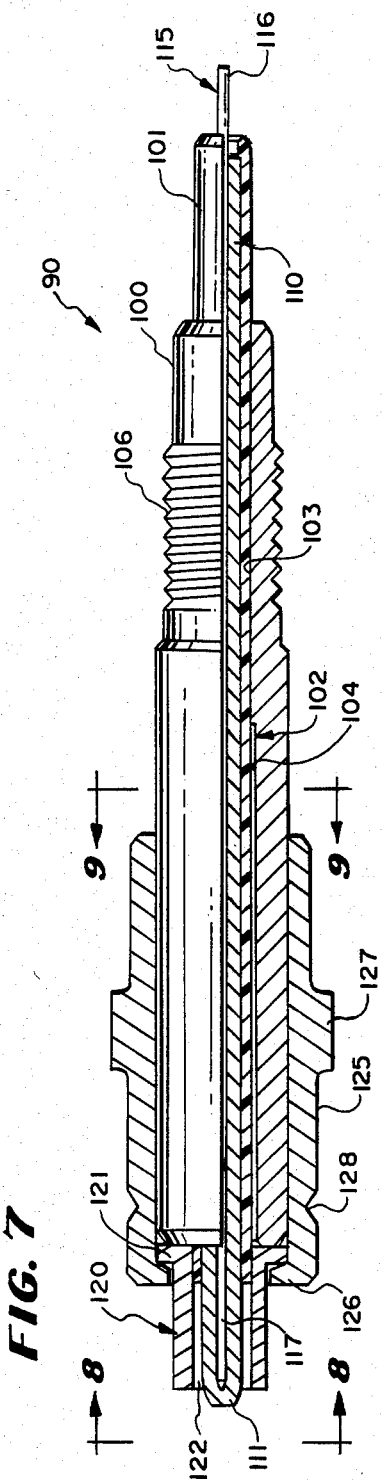
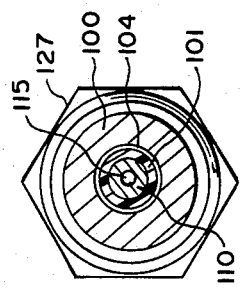
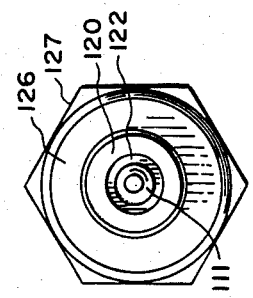
FIG. 7
FIG. 9
FIG. 8

DUAL ENGINE PROBE

BACKGROUND OF THE INVENTION

The present invention deals with a probe for use in apparatus that analyzes timing and engine speed of a diesel engine.

In analyzing the timing events in an internal combustion engine, determination is made of the number of degrees of crank shaft rotation between the time the piston in a selected cylinder reaches its so-called "top dead center" position and the time that combustion takes place in that cylinder. Automobile manufacturers commonly specify the number of degrees at a specific engine speed. Thus, the events of top dead center and combustion must be determined. One type of probe has been developed that enables sensing both events. In a diesel engine, the glow plug for a selected cylinder is replaced with such probe. The probe includes means for conducting light produced during the combustion event. It also includes means for conducting microwave energy into the cylinder and conducting from the cylinder microwave energy modulated therein during engine operation. Such a probe is described in U.S. Pat. No. 4,337,648, issued Jul. 6, 1982 and assigned to Jodon Engineering Associates, Inc. Jodon has made and sold a probe like that shown in the patent but somewhat different.

SUMMARY OF THE INVENTION

It is an important object of the present invention to provide a dual probe which has improved performance over that disclosed in U.S. Pat. No. 4,337,648.

In summary, there is provided a probe for accessing timing event signals in an internal combustion engine and adapted to be inserted into the threaded opening of a selected cylinder in such engine, the probe comprising an elongated body including a bore extending therethrough and including front and rear ends, a tube composed of light-transmitting material and being disposed in the bore and extending from a point rearwardly of the front end substantially to said rear end, and a microwave conductor in the tube protruding from the front end and extending substantially to the rear end.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings preferred embodiments thereof, from an inspection of which, when considered in connection with the following description, the invention, its construction and operation, and many of its advantages should be readily understood and appreciated.

FIG. 1 is a view partly in elevation and partly in longitudinal cross section, depicting a dual probe incorporating the features of the present invention;

FIG. 2 is a view in transverse cross section taken along the line 2—2 of FIG. 1;

FIG. 3 is a view in transverse cross section taken along the line 3—3 of FIG. 1;

FIG. 4 is a view partly in elevation and partly in longitudinal cross section, depicting a dual probe incorporating a second embodiment of the present invention;

FIG. 5 is an end elevational view taken along the line 5—5 of FIG. 4;

FIG. 6 is a view in transverse cross section taken along the line 6—6 of FIG. 4;

FIG. 7 is a view partly in elevation and partly in longitudinal cross section, depicting a dual probe incorporating a third embodiment of the present invention;

FIG. 8 is an end elevational view taken along the line 8—8 of FIG. 7; and

FIG. 9 is a view in transverse cross section taken along the line 9—9 of FIG. 7.

DETAILED DESCRIPTION OF THE PREFERRED EMBODIMENTS

Turning now to FIGS. 1-3, there is depicted a probe 10 incorporating the features of the present invention. The probe 10 is adapted to be threaded into the threaded opening of the engine head 12 of the engine. Such opening provides access to the selected cylinder to be evaluated. In the case of a diesel engine, such opening normally receives a glow plug. The glow plug is removed during test and is replaced by the probe 10. Telescopically applied to the rear of the probe 10 is a generally cup-shaped coupler 14 which has a ball 15 and a spring 16 so that the coupler 14 can be snapped onto the probe 10 as will be described. The details of the coupler 14 are not pertinent to the present invention.

The probe 10 transmits light generated during combustion from front to rear. Microwave energy is generated by circuitry (not shown) connected to the coupler 14, applied to the probe 10 via the coupler 14, and is conducted by the probe 10 from the rear to the selected cylinder. The probe 10 also relays back to the circuitry the microwave signals modulated in the selected cylinder in response. The coupler includes means (not shown) for detecting light transmitted by the probe 10 during combustion.

The probe 10 comprises an elongated body 20 which is annular in transverse cross section and is stepped at two points to define three segments of different diameters. Extending entirely through the body 20 is a bore 21 having a short portion 22 at the front, a long portion 23 at the rear, and a mid-portion 24 between the portions 22 and 23. In an operating form of the invention, the portion 22 had a length of 0.07 inch, the portion 23 had a length of 3.4 inches and the portion 24 had a length of 0.9 inch. The radially directed surface between the portions 22 and 24 defines a shoulder 25. The middle region of the body 20 has external threads 26 for engaging the threaded opening in the engine head 12. The body 20 has a beveled or frustoconical surface 27 that mates with a corresponding surface in the opening of the engine head 12.

The probe 10 further comprises a tube 30 composed of light-transmitting material such as fused silica. The outside diameter of the tube 30 substantially matches the diameter of the mid-portion 24 of the bore 21. The tube 30 is disposed in the bore 21 with one end abutting the shoulder 25 and the other end protruding rearwardly of the rear end of the body 20. The probe 10 also comprises a microwave conductor 35 being longer than the tube 30 and disposed in the bore thereof. The front end 36 of the conductor 35 protrudes forwardly of both the tube 30 and the body 20, and the rear end 37 protrudes rearwardly of the body 20 and the tube 30.

The probe 10 further comprises a generally cylindrical, non-conductive shield 40 disposed at the rear end of the body 20 in end-to-end relationship therewith. The shield 40 has a radially outwardly directed flange 41 at its front end. The shield 40 has a cylindrical cavity 42 of a diameter exceeding the diameter of the tube 30. In the particular embodiment shown, the diameter is slightly greater than the diameter of the rear portion 23 of the bore 21. A port 43 in the shield 40 communicates with the cavity 42 and has a diameter slightly greater than the diameter of the conductor 35, in order to receive the rear conductor end 37 as shown. The shield 40 is translucent to pass light from the tube 30 to a photodetector (not shown) in the coupler 14.

The probe 10 also comprises a sleeve 45 having an inside diameter matching the outside diameter of the rear segment of the body 20. The sleeve 45 carries at its rear end a radially inwardly directed flange 46. The sleeve 45 encompasses both the body 20 and the shield 40 and is bonded thereto, the flange 46 abutting against the flange 41, thereby to retain the shield 40 against the body 20. The sleeve 45 has an hexagonal surface 47 for engagement by a tool to thread the probe 10 into the engine head 12. The sleeve 45 has an annular V notch 48 therein to effect a detent relationship with the ball 15 in the coupler 14.

In use, the glow plug associated with the selected cylinder is removed from the engine block 12. The probe 10 is aligned with that opening and rotated therein using a suitable tool that engages the surface 47. Then, the coupler 14 is snap-fitted onto the exposed rear end of the probe 10. Circuitry to which the coupler 14 is connected supplies microwave energy which is transmitted through the shield 40 and into the rear end 37 of the conductor 35. That energy is conducted via the conductor 35 into the selected engine cylinder. Microwave energy modulated in the cylinder is coupled back via the conductor 35 into the circuitry. Such energy is processed and is indicative of the occurrence of top-dead-center events. At the same time, light occurring during combustion in the selected cylinder passes through the front portion 22 of the bore 21 and into the tube 30, which transmits such light into the cavity 42 of the shield 40. The light passes through the translucent shield 40 and into a light detector (not shown). With information on combustion and the occurrence of top dead center, timing of the engine can be determined.

In assembly, the conductor 35 is bonded in the tube 30 by using an adhesive which preferably is flexible, such as acrylic. DYMAX 828 structural acrylic has proved satisfactory. The flexibility of acrylic accommodates thermal expansion of the conductor 35 caused by the hot engine, so as not to shatter the silica tube 30. Then, the tube 30 with the conductor 35 therein is inserted into the body 20. A flexible adhesive is used between the tube 30 and the mid-portion 24 of the bore 21. The annulus between the rear portion 23 and the tube 30 is then back filled with a rigid adhesive such as epoxy. Epoxy has good strength in the presence of high temperature, and provides excellent sealing of combustion gases. The front region of the probe 10 is, of course, exposed to the high engine temperature and the adhesive in the mid-portion 24 burns out leaving a flexible residue which provides a seal against entry of soot. The epoxy on the other hand permanently bonds the tube 30 in the body 20. The adhesive between the sleeve 45 and the body 20 can also be the same acrylic used to bond the front end of the tube 30 to the body 20.

The front end of the tube 30 being recessed reduces formation on the tube of soot formed in the cylinder. Also, the tube 30 being somewhat isolated from the extreme heat in the cylinder is at a lower temperature thereon to reduce the amount of devitrification thereof. This isolation is achieved by virtue of the front end of the tube 30 being seated against the shoulder 25.

The body 20 preferably is composed of stainless steel so as to be resistant to corrosion that would occur as the result of combustion. Also, it preferably has one-piece construction to improve transfer of heat from the cylinder, via the body 20, and into the engine head 12. As a result, the exposed portion of the probe 10 is only warm to the touch. The sleeve 45 is preferably composed of heat-treated steel so that the hexagonal surface 47 is hardened and better able to withstand socket engagement.

The conductor 35 is preferably composed of a nickel-chromium alloy, 70% nickel and 30% chromium performing exceptionally well. A conductor with such composition has excellent corrosion and sag resistance at high temperatures. The conductor 35 may be plated with conductive silver to enhance microwave propagation. By utilizing a conductor 35 composed of nickel chromium, the diameter can be smaller, yet obtain the necessary rigidity to minimize bending of the end 36 during use. A smaller diameter wire also enables the diameter of the bore through the tube 30 to be less, thereby increasing the cross-sectional area of the tube 30 and the light transmission capability thereof.

The shield 40 protects the rear end of the silica tube 30 and the conductor 35 which is disposed in the cavity 42. Being translucent, it permits passage of light from the tube 30 but attenuates it. The length of the shield 40 controls the amount of attenuation. Optimum length will provide just the right amount of light to the photodetector. The shield 40 being plastic has no effect on the microwave energy emitted by the conductor 35.

The probe 10 therefore is of more rugged construction, incorporating a one-piece body 20 and a conductor 35 preferably composed of nickel chromium so as in use to hold up better for a given diameter. The probe 10 has fewer parts and is simpler to assemble, thereby providing economies in manufacture. The probe 10 furnishes a better seal to combustion gases by virtue of the epoxy between the tube 30 and body 20.

FIGS. 4-6 depict a probe 50 incorporating the features of a second embodiment of the present invention and is used in the same way as the probe 10. The probe 50 comprises an elongated body 60 which is annular in transverse cross section and is stepped to define two segments at different diameters. Extending entirely through the body 60 is a bore 61 having a short portion 62 at the front, a long portion 63 at the rear, and a mid portion 64 between the portions 62 and 63. The longer rear region of the body 60 has external threads 66 for engaging the threaded opening in the engine block. Formed on the exterior of the body 60 and behind the threads 66 are external bosses 67 for engagement by a tool to thread the probe 50 into the engine block.

The probe 50 further comprises a generally cylindrical, non-conductive shield 80 disposed at the rear end of the body 60 in end-to-end relationship therewith. The shield 80 has a radially outwardly directed flange 81 at its front end. The shield 80 has a cylindrical cavity 82 of a diameter exceeding the diameter of the tube 70.

The probe 50 also comprises a sleeve 85 having an inside diameter matching the outside diameter of the rear segment of the body 60. The sleeve 85 carries at its rear end a radially inwardly directed flange 86. The sleeve 85 encompasses both the body 60 and the shield 80 and is bonded thereto, the flange 86 abutting the flange 81, thereby to retain the shield 80 against the body 60. The sleeve 85 has an annular V notch 88 to effect a detent relationship with the ball 15 in the coupler 14.

The probe 50 is used and is assembled in basically the same way as the probe 10. In the probe 50, no shoulder 25 is provided, but the tube 70 is nevertheless recessed. The bosses 67 are on the body 60 instead of the sleeve.

The probe 50 further comprises a tube 70 composed of light-transmitting material. The outside diameter of the tube 70 substantially matches the diameter of the mid-portion 64 of the bore 61. The tube 70 is disposed in the bore 61 with one end spaced from the front end of the body 60 so as to be recessed as shown. The other end of the tube 70 protrudes rearwardly of the rear of the body 60. The probe 50 also comprises a microwave conductor 75 being longer than the tube 30 and disposed in the bore thereof. The front conductor end 76 protrudes forwardly of both the tube 70 and the body 60, and the rear end 77 protrudes rearwardly of the body 60. The rear end of the tube 70 is closed at 71 to protect the end of the conductor 75, to preclude dirt from becoming deposited thereon, to seal the assembly from combustion gases, and to create a lens for focusing the transmitted light. The end 71 being fused silica does not affect conduction of microwave energy on the conductor 75.

A third embodiment is depicted in FIGS. 7-9. The probe 90 includes an elongated body defined by coaxial outer and inner metallic tubes 100 and 101, the front end of the inner tube 101 protruding from the front end of the outer tube 100. Extending entirely through the inner tube 101 is a bore 102 having a front portion 103 and a rear portion 104 each occupying about half the length of the bore 102 in the embodiment shown. The probe 90 further comprises a tube 110 composed of light-transmitting material. The outside diameter of the tube 110 substantially matches the diameter of the portion 103 of the bore 102. The tube 110 is disposed in the bore 102 with one end spaced rearwardly at the front of the inner tube 101, the other end protruding rearwardly of the rear end of the outer tube 100. The probe 90 also comprises a microwave conductor 115 being longer than the tube 110 and disposed in the bore thereof. The front end 116 of the conductor 115 protrudes forwardly of the tube 101 and 110. The rear end of the tube 110 is closed at 111 in the same manner and for the same purpose as in the probe 50.

The probe 90 further comprises a generally cylindrical, non-conductive shield 120 disposed at the rear end of the tube 100 in end-to-end relationship. The shield 120 has a radially outwardly directed flange 121 at its front end. The shield 120 has a cylindrical cavity 122 of a diameter exceeding the diameter of the tube 110. The probe 90 also comprises a sleeve 125 having an inside diameter matching the outside diameter of the rear segment of the tube 100. The sleeve 125 carries at its rear end a radially inwardly directed flange 126. The sleeve 125 encompasses both the tube 100 and the shield 120 and is bonded thereto, the flange 126 abutting against the flange 121, thereby to retain the shield 120 against the tube 100. The sleeve 125 has an hexagonal surface 127 similar to the first embodiment.

In this embodiment, the body is not one piece, but rather is composed of two coaxial tubes. It is assembled in basically the same way and is used in the same way as the probe 10. It has some of the features of each of the other two embodiments.

What has been described therefor is an improved dual probe in which the light-transmitting conductor is recessed and has other important advantages over previously patented dual probes and those in the marketplace.

I claim:

1. A probe for accessing timing event signals in an internal combustion engine including a selected cylinder which has a threaded opening, said probe being adapted to be inserted into the threaded opening, said probe comprising an elongated body including a bore extending therethrough and including front and rear ends, said bore having a reduced diameter portion adjacent to said front end, said elongated body including a shoulder at the rear end of said reduced diameter portion, a tube composed of light-transmitting material having a first end abutting said shoulder and having a second end protruding slightly beyond said rear end, a microwave conductor in said tube having a first end protruding from said front end and having a second end protruding slightly beyond said rear end, a tubular non-conductive shield disposed at said rear end in end-to-end relationship with said body, said shield including a front portion and a rear portion, said shield including in said front portion a cavity of a diameter greater than the diameter of said tube and receiving therein the second ends of said tube and said microwave conductor, said shield including in said rear portion a port of a diameter slightly greater than the diameter of said microwave conductor, and a sleeve encompassing portions of said shield and said body.

2. The probe of claim 1, wherein said shield has a front end carrying a radially outwardly directed sleeve flange, said sleeve having a rear end carrying an inwardly directed radial flange, said sleeve being bonded to said body with said sleeve flange abutting said shield flange, thereby to retain said shield against said body.

3. The probe of claim 1, wherein said sleeve has an external thread-engaging surface for engagement by a tool to facilitate mounting said probe in the combustion engine.

4. A probe for accessing timing event signals in an internal combustion engine including a selected cylinder which has a threaded opening, said probe being adapted to be inserted into the threaded opening said probe comprising an elongated body including a bore extending therethrough and including front and rear ends, said bore having a first portion of smallest diameter adjacent to said front end and a second portion of greatest diameter extending forwardly from said rear end and a third portion of intermediate diameter between said first and second portions, said elongated body including a shoulder at the rear end of said first portion, a tube composed of light-transmitting material and being disposed in said bore extending from said shoulder generally to said rear end, a relatively rigid adhesive between said second portion and said tube, a relatively flexible adhesive between said third portion and said tube, a microwave conductor in said tube and protruding from said front end and extending generally to said rear end, and a relatively flexible adhesive between said microwave conductor and said tube for resiliently bonding the microwave conductor therein.

5. The probe of claim 4, wherein said first portion has a length on the order of about 0.07 inch, said second portion has a length on the order of about 3.4 inches and said third portion has a length on the order of about 0.9 inch.

6. The probe of claim 4, wherein said rigid adhesive is an epoxy and said flexible adhesive is an acrylic.

7. The probe of claim 4, and further comprising a sealing shoulder on the exterior of said body radially aligned with a point in said third portion, said sealing shoulder being shaped to mate with a surface adjacent to the threaded opening in the engine.

* * * * *